(12) United States Patent
Anilovich et al.

(10) Patent No.: US 8,014,930 B2
(45) Date of Patent: Sep. 6, 2011

(54) SYSTEM AND METHOD FOR DETERMINING OXYGEN SENSOR HEATER RESISTANCE

(75) Inventors: Igor Anilovich, Walled Lake, MI (US);
John W. Siekkinen, Novi, MI (US);
Michael John Dokter, Okemos, MI (US); Jens Vollstaedt, Eppstein (DE);
Michael Schellong, Russelsheim (DE);
Per-Olof Blom, Trollhattan (SE)

(73) Assignee: GM Global Technology Operations LLC

( * ) Notice: Subject to any disclaimer, the term of this patent is extended or adjusted under 35 U.S.C. 154(b) by 384 days.

(21) Appl. No.: 12/391,540

(22) Filed: Feb. 24, 2009

(65) Prior Publication Data

US 2010/0114453 A1    May 6, 2010

Related U.S. Application Data

(60) Provisional application No. 61/109,645, filed on Oct. 30, 2008.

(51) Int. Cl.
*F02D 45/00* (2006.01)
*F01N 9/00* (2006.01)
*G06F 19/00* (2006.01)

(52) U.S. Cl. ........................................................ 701/102
(58) Field of Classification Search .................. 701/102, 701/101, 108, 109; 73/23.2, 23.31, 23.25, 73/23.27, 114.73
See application file for complete search history.

(56) References Cited

U.S. PATENT DOCUMENTS

| | | | | |
|---|---|---|---|---|
| 4,834,863 A | * | 5/1989 | Yamada et al. | 204/429 |
| 5,461,902 A | * | 10/1995 | Iwata | 73/23.32 |
| 5,928,303 A | * | 7/1999 | Sakai | 701/109 |
| 7,036,351 B2 | * | 5/2006 | Smith | 73/23.2 |

* cited by examiner

*Primary Examiner* — Hieu T Vo

(57) ABSTRACT

An engine control module includes an exhaust heating module, a temperature determination module, and a resistance measuring module. The exhaust heating module operates an engine at a predetermined speed to generate an exhaust gas having a predetermined temperature. The exhaust gas heats a heating element of an oxygen sensor. The temperature determination module determines, based on the predetermined speed, when the heating element is heated to the predetermined temperature. The resistance measuring module determines a resistance of the heating element when the heating element is heated to the predetermined temperature.

16 Claims, 4 Drawing Sheets

SYSTEM AND METHOD FOR DETERMINING OXYGEN SENSOR HEATER RESISTANCE

CROSS-REFERENCE TO RELATED APPLICATIONS

This application claims the benefit of U.S. Provisional Application No. 61/109,645, filed on Oct. 30, 2008. The disclosure of the above application is incorporated herein by reference.

FIELD

The present disclosure relates to control systems for calibrating exhaust system components, and more particularly to determining the resistance of an oxygen sensor heater.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle that includes an internal combustion engine may produce exhaust with varying concentrations of oxygen. The vehicle may include one or more oxygen sensors to monitor the oxygen concentration in the exhaust. Oxygen sensors typically include a sensor element and a heating element. The sensor element operates effectively after reaching a predetermined sensor temperature (e.g., 600° C.). An engine control module may actuate the heating element to heat the sensor element to the predetermined sensor temperature.

The engine control module determines that the heating element is at the predetermined sensor temperature based on a resistance of the heating element and a heating element model. The engine control module determines the resistance of the heating element based on voltage applied to the heating element and current through the heating element. The heating element model provides a temperature of the heating element based on the resistance of the heating element.

The resistance of the heating element varies among oxygen sensors. The heating element model of each oxygen sensor therefore should be determined when the oxygen sensor is installed in the vehicle. Typically, the heating element model of a particular oxygen sensor is determined based on the resistance of the heating element after a cold start, when the vehicle is at ambient temperature (e.g., 20° C.).

SUMMARY

An engine control module comprises an exhaust heating module, a temperature determination module, and a resistance measuring module. The exhaust heating module operates an engine at a predetermined speed to generate an exhaust gas having a predetermined temperature. The exhaust gas heats a heating element of an oxygen sensor. The temperature determination module determines, based on the predetermined speed, when the heating element is heated to the predetermined temperature. The resistance measuring module determines a resistance of the heating element when the heating element is heated to the predetermined temperature.

An engine control method comprises operating an engine at a predetermined speed to generate an exhaust gas having a predetermined temperature and heating a heating element of an oxygen sensor using the exhaust gas. The method further comprises determining, based on the predetermined speed, when the heating element is heated to the predetermined temperature. Additionally, the method comprises determining a resistance of the heating element when the heating element is heated to the predetermined temperature.

BRIEF DESCRIPTION OF THE DRAWINGS

The drawings described herein are for illustration purposes only and are not intended to limit the scope of the present disclosure in any way.

DETAILED DESCRIPTION

Figure 1:
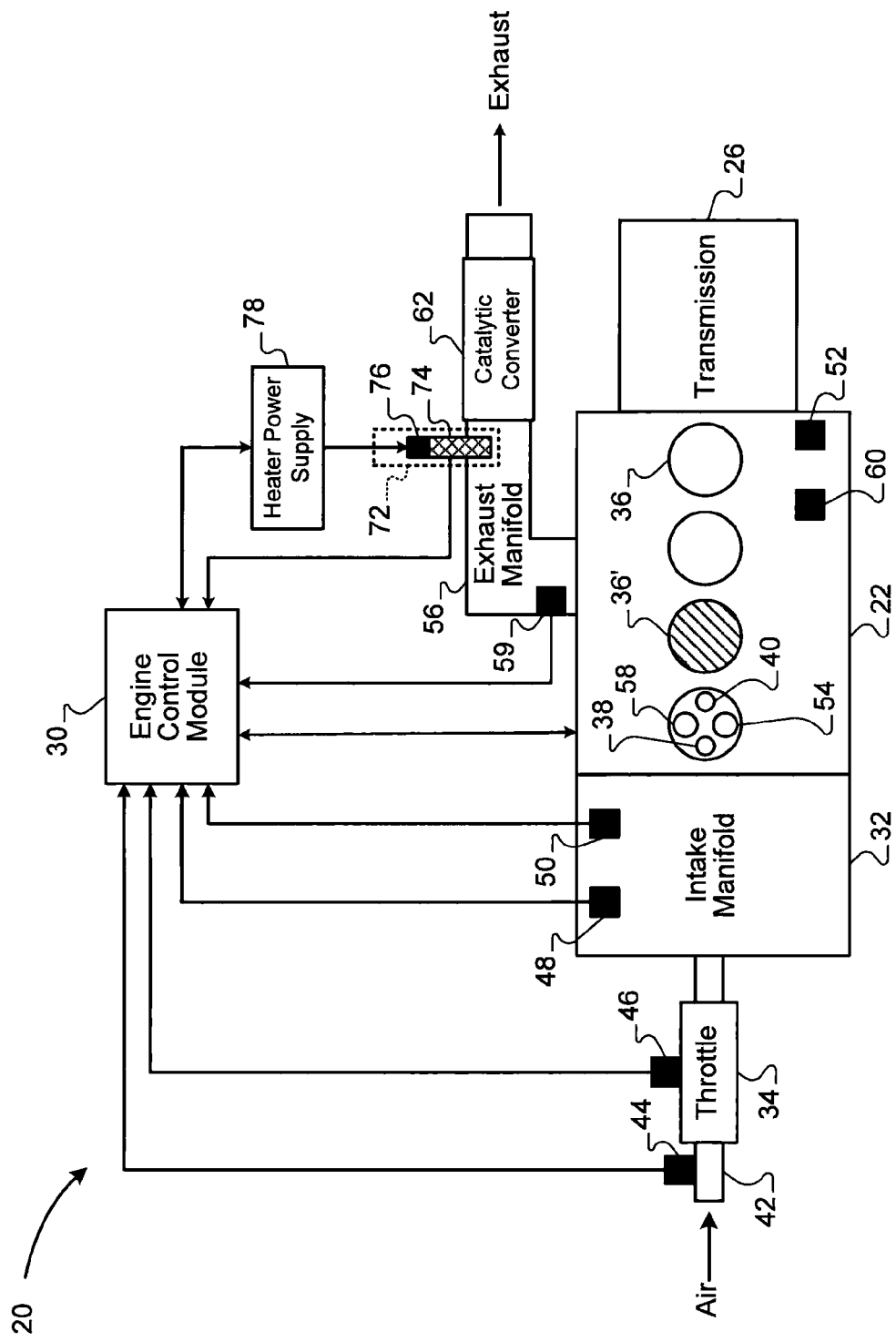
FIG. 1 is a functional block diagram of a vehicle system according to the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Typically, resistance of the oxygen sensor heating element is determined during a cold start because the heating element is at a known temperature (e.g., ambient temperature). A vehicle that has been recently driven may not reach a cold start condition until it has been off for an extended period of time (e.g., 8-10 hours). Therefore, when the vehicle is driven to the service bay the resistance of the oxygen sensor heating element may not be verified unless the vehicle is kept turned off at the service bay for the extended period of time. A vehicle owner who cannot leave the vehicle at the service bay for the extended period of time may leave the service bay with an oxygen sensor heating element having an undetermined resistance. The vehicle owner may be inconvenienced if the heating element is found defective after the vehicle has been cold started outside the service bay.

The heating element resistance determination system of the present disclosure determines the resistance of the heating element at elevated temperatures. The system operates the engine at a predetermined engine speed during idle to generate a predetermined exhaust temperature. The system disables the heating element so that the heating element reaches the predetermined exhaust temperature. The system determines the resistance of the heating element at the predetermined exhaust temperature and determines the heating element model based on the resistance at the predetermined exhaust temperature. The system can test the functionality of an oxygen sensor heating element in a short period of time in the service bay without waiting for a cold start. Accordingly, the system may be implemented to determine the resistance of the oxygen sensor heating element after a new installation in the service bay.

Referring now to FIG. 1, an exemplary vehicle system 20 includes a combustion engine 22 that drives a transmission 26. While a spark ignition engine is illustrated, compression ignition engines are also contemplated. A throttle 34 may regulate airflow into an intake manifold 32. Air within the intake manifold 32 is distributed into cylinders 36. An engine control module 30 may deactivate one or more selected cylinders 36' during engine operation. The selected cylinder 36' is deactivated when the engine control module 30 does not actuate a corresponding fuel injector 38 to inject fuel into the selected cylinder 36'. A cylinder 36 is active when the engine control module 30 actuates the corresponding fuel injector 38 to inject fuel into the cylinder 36. Each cylinder 36 may include a spark plug 40 for igniting the air/fuel mixture. Alternatively, the air/fuel mixture may be ignited by compression in a diesel application. Although FIG. 1 depicts four cylinders 36, the engine 22 may include additional or fewer cylinders 36. For example, engines having 5, 6, 8, 10, 12, and 16 cylinders are contemplated. The engine 22 may also provide for an active fuel management system (not shown) that deactivates intake and exhaust valves 54, 58 corresponding to the selected cylinder 36'.

The engine control module 30 communicates with components of the vehicle system 20. Components of the vehicle system 20 include the engine 22, sensors, and actuators as discussed herein. The engine control module 30 may implement the heating element resistance determination system of the present disclosure.

Air is passed from an inlet 42 through a mass airflow (MAF) sensor 44, such as a mass airflow meter. The MAF sensor 44 generates a MAF signal that indicates a rate of air flowing through the MAF sensor 44. Inlet air may be metered to the engine 22 via the throttle 34. For example only, the throttle 34 may be a butterfly valve that rotates within the inlet 42. The throttle 34 is actuated based on an engine operating point commanded by an operator and/or a controller. A throttle position sensor (TPS) 46 generates a TPS signal that indicates a position of the throttle 34.

A manifold pressure (MAP) sensor 48 is positioned in the engine intake manifold 32 between the throttle 34 and the engine 22. The MAP sensor 48 generates a MAP signal that indicates manifold absolute air pressure. An intake air temperature (IAT) sensor 50 located in the intake manifold 32 generates an IAT signal based on intake air temperature.

An engine crankshaft (not shown) rotates at engine speed or a rate that is proportional to the engine speed. A crankshaft sensor 52 senses a position of the crankshaft and generates a crankshaft position (CSP) signal. The CSP signal may depend on the rotational speed of the crankshaft and cylinder events. For example only, the crankshaft sensor 52 may be a variable reluctance sensor. The engine speed and cylinder events may be sensed using other suitable methods.

The intake valve 54 selectively opens and closes to enable air to enter the cylinder 36. An intake camshaft (not shown) regulates intake valve position. A piston (not shown) compresses the air/fuel mixture within the cylinder 36. The engine control module 30 actuates the fuel injector 38 to inject fuel into the cylinder 36. The engine control module 30 may also actuate the spark plug 40 to initiate combustion of the air/fuel mixture, thereby driving the piston in the cylinder 36. Alternatively, the air/fuel mixture may be ignited by compression in a diesel application. The piston drives the crankshaft to produce drive torque. Combustion exhaust within the cylinder 36 is forced out through an exhaust manifold 56 when the exhaust valve 58 is in an open position. An exhaust camshaft (not shown) regulates exhaust valve position. Although single intake and exhaust valves 54, 58 are illustrated, the engine 22 may include multiple intake and exhaust valves 54, 58 per cylinder 36.

The exhaust manifold 56 may include an exhaust manifold air temperature (EMT) sensor 59. The EMT sensor 59 may generate an EMT signal that indicates exhaust temperature. The engine 22 may include a cooling system that circulates an engine coolant. An engine coolant temperature (ECT) sensor 60 may generate an ECT signal that indicates engine coolant temperature. The ECT sensor 60 may be located within the engine 22 or at other locations where the engine coolant is circulated, such as a radiator (not shown).

The vehicle system 20 may include a catalytic converter 62 that treats exhaust. The vehicle system 20 may include an oxygen sensor 72 installed in the exhaust manifold 56. While a single oxygen sensor 72 is shown, the vehicle system 20 may include two or more oxygen sensors 72. The oxygen sensor 72 generates oxygen level signals indicative of oxygen concentration in the exhaust. The engine control module 30 may actuate the fuel injectors 38 and determine an efficiency of the catalytic converter 62 based on the oxygen level signals.

The oxygen sensor 72 may include a sensor element 74 and a heating element 76. The heating element 76 heats the sensor element 74 to the predetermined sensor temperature. The predetermined sensor temperature may be a temperature at which the sensor element 74 operates effectively (e.g., 600° C.). The heating element 76 may include a wire that is electrically heated. The heating element 76 may be located in proximity to the sensor element 74 so that the sensor element 74 and the heating element 76 are at the same temperature. A heater power supply 78 supplies a heater voltage and a heater current to the heating element 76. The heater voltage and the heater current may collectively be called "heater power." The engine control module 30 actuates the heater power supply 78 to generate the heater power. The engine control module 30 may actuate the heater power supply 78 to heat the heating element 76 to the predetermined sensor temperature.

Figure 2:
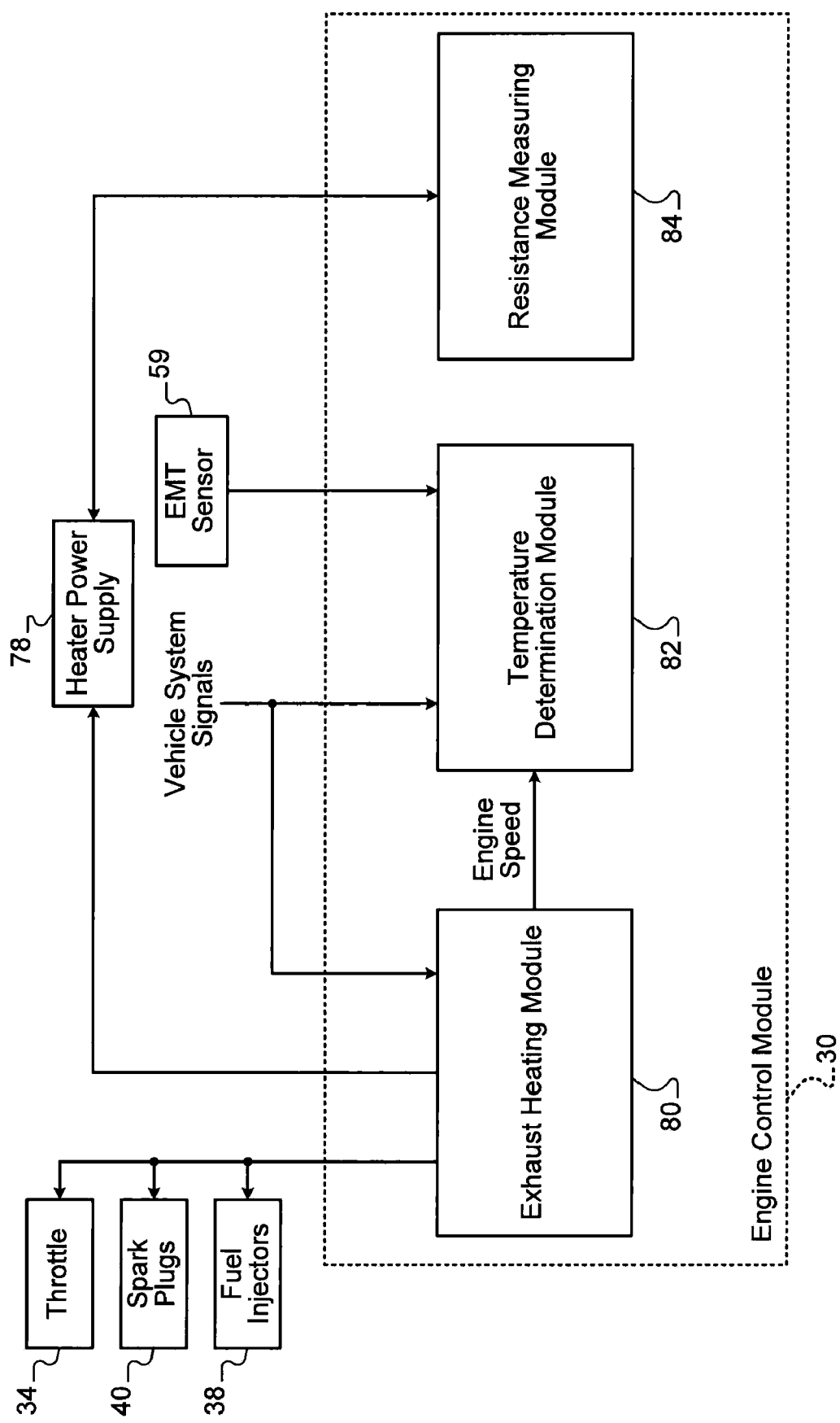
FIG. 2 is a functional block diagram of an engine control module according to the present disclosure.

Referring now to FIG. 2, the engine control module 30 includes an exhaust heating module 80, a temperature determination module 82, and a resistance measuring module 84. The engine control module 30 receives input signals from the vehicle system 20. The input signals include the MAF, TPS, MAP, IAT, CSP, EMT, ECT, and oxygen level signals. The input signals are hereinafter referred to as "vehicle system signals." The engine control module 30 processes the vehicle system signals and generates timed engine control commands that are output to the vehicle system 20. For example, engine control commands may actuate the throttle 34, the fuel injectors 38, the spark plugs 40, and the heater power supply 78.

The exhaust heating module 80 actuates the heater power supply 78 to disable the heating element 76. The heating element 76 is not electrically heated when disabled. The heater power supply 78 may disable the heating element 76 by limiting the heater power supplied to the heating element 76. For example, the heater power supply 78 may disable the heating element 76 by supplying a low heater power. The heater power supply 78 may also disable the heating element 76 by supplying no heater power to the heating element 76. The heating element 76 is heated by the exhaust when the heating element 76 is disabled.

The exhaust heating module 80 operates the engine 22 at the predetermined engine speed during idle when the heating element 76 is disabled. For example only, the predetermined engine speed may be an elevated engine speed (e.g., 2500 RPM). The exhaust heating module 80 may actuate the fuel injectors 38, the throttle 34, and the spark plugs 40 to achieve the predetermined engine speed.

The temperature determination module 82 determines whether the exhaust is heated to the predetermined exhaust temperature. The temperature determination module 82 may determine that the exhaust is heated to the predetermined exhaust temperature based on an exhaust temperature model. The exhaust temperature model may determine a period of time based on the predetermined engine speed. The period of time may be a period from engine start-up until the exhaust is heated to the predetermined exhaust temperature. For example only, for an engine speed of 2500 RPM, the predetermined exhaust temperature may be 600° C. and the period of time may be 250 seconds. The temperature determination module 82 may also determine that the exhaust is heated to the predetermined exhaust temperature based on EMT signals if the vehicle system 20 includes the EMT sensor 59.

The temperature of the heating element 76 may be equal to the temperature of the exhaust because the heating element 76 is heated by the exhaust when the heating element 76 is disabled. For example, the heating element 76 may be heated only by the exhaust when the heating element 76 is disabled. The temperature determination module 82 determines that the heating element 76 is heated to the predetermined exhaust temperature based on the exhaust temperature model. For example, the temperature determination module 82 may determine that the heating element 76 is heated to the predetermined exhaust temperature after the period of time.

Alternatively, the temperature determination module 82 may determine that the heating element 76 is heated to the predetermined exhaust temperature based on EMT signals if the vehicle system 20 includes the EMT sensor 59. The temperature determination module 82 may determine that the heating element 76 is at the predetermined exhaust temperature when the EMT signals indicate that the exhaust is at the predetermined exhaust temperature.

Figure 3:
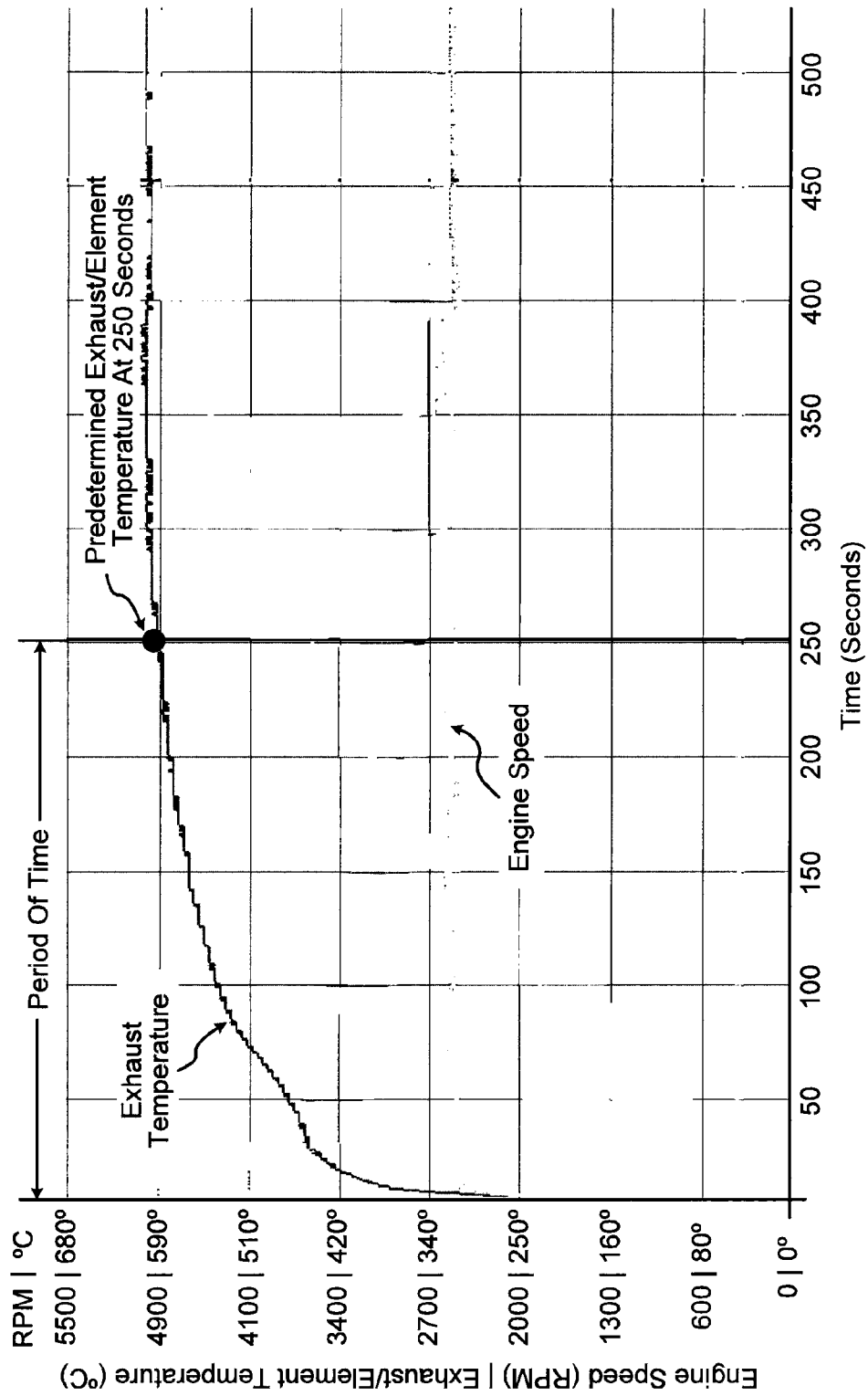
FIG. 3 is a graph that illustrates exhaust temperature and oxygen sensor heating element temperature based on a predetermined engine speed according to the present disclosure.

Referring now to FIG. 3, a graph illustrates the temperature of the exhaust and the heating element 76 based on the predetermined engine speed. The temperature of the heating element 76 may be equal to the temperature of the exhaust. The predetermined engine speed is approximately 2500 RPM. The temperature of the exhaust and the heating element 76 reaches the predetermined exhaust temperature after the period of time (i.e., 250 seconds).

The exhaust temperature model may be based on the data shown in FIG. 3, or other data. For example only, an exhaust model based on FIG. 3 may determine that the heating element 76 reaches the predetermined exhaust temperature after 250 seconds when the exhaust heating module 80 operates the engine at 2500 RPM. FIG. 3 illustrates the period of time for a single predetermined engine speed, however other predetermined engine speeds are anticipated.

Referring again to FIG. 2, the resistance measuring module 84 actuates the heater power supply 78 to enable the heating element 76 when the heating element 76 is at the predetermined exhaust temperature. The resistance measuring module 84 actuates the heater power supply 78 to apply a predetermined voltage to the heating element 76. The resistance measuring module 84 measures an amount of current supplied by the heater power supply 78 when the heater power supply 78 applies the predetermined voltage to the heating element 76. The resistance measuring module 84 determines the resistance of the heating element 76 based on the amount of current supplied and the predetermined voltage. The resistance measuring module 84 may determine the resistance of the heating element 76 by dividing the predetermined voltage by the amount of current. The resistance measuring module 84 determines the resistance of the heating element 76 immediately after applying the predetermined voltage to prevent electrical heating of the heating element 76 prior to determining the resistance.

The resistance measuring module 84 determines the heating element model for the oxygen sensor 72 based on the resistance of the heating element 76 and the temperature of the heating element (i.e., the predetermined exhaust temperature). The resistance measuring module 84 may determine the heating element model by extrapolating the temperature and the resistance of the heating element 76 from the resistance of the heating element 76 at the predetermined exhaust temperature. The resistance measuring module 84 may extrapolate the temperature and the resistance of the heating element 76 based on a mathematical function or a look-up table. For example, the resistance measuring module 84 may extrapolate the temperature and the resistance of the heating element based on a linear temperature-resistance function. The heating element model may include a mathematical function and/or a look-up table that correlates the resistance of the heating element 76 and the temperature of the heating element 76.

Figure 4:
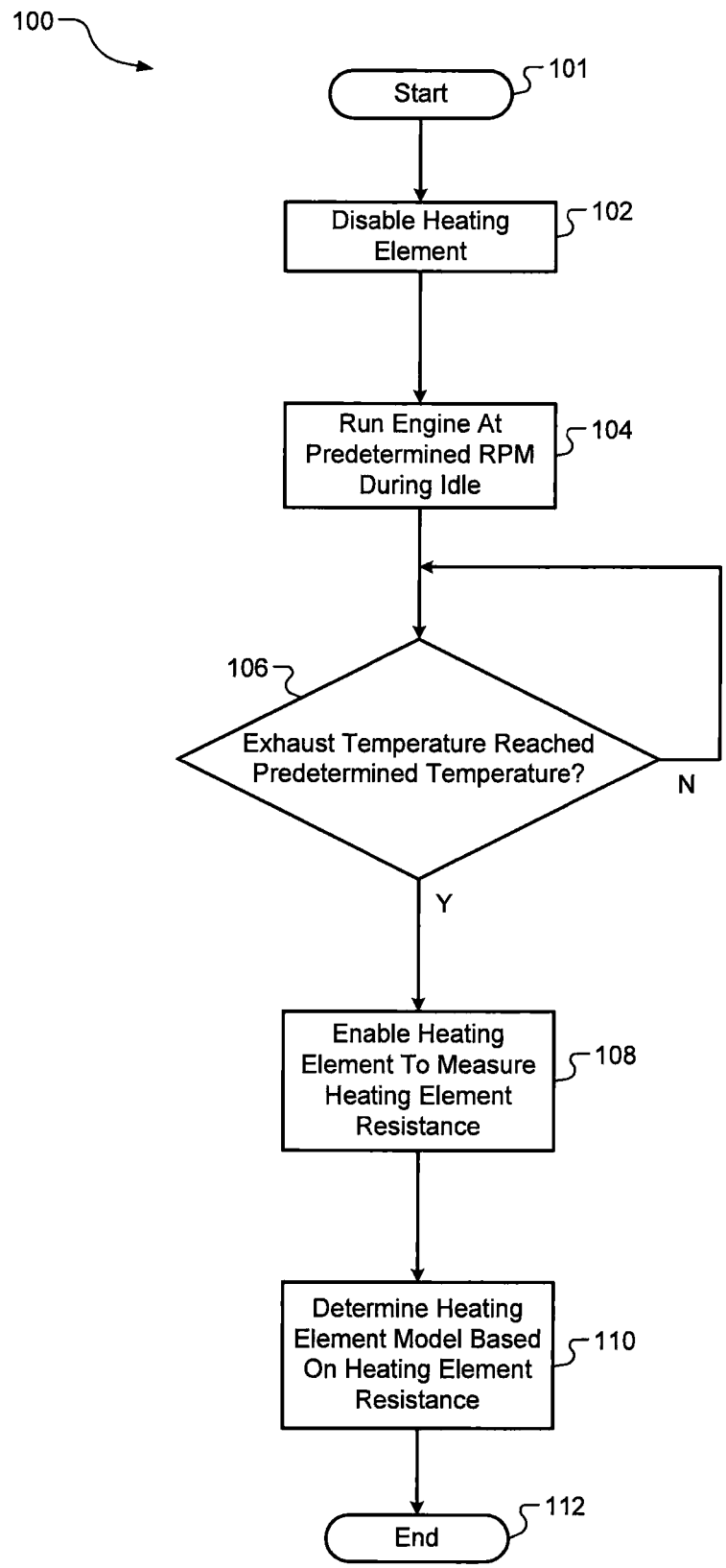
FIG. 4 is a flow diagram that illustrates the steps of a method for determining oxygen sensor heater resistance according to the present disclosure.

Referring now to FIG. 4, a method 100 for determining oxygen sensor heater resistance starts in step 101. In step 102, the exhaust heating module 80 disables the heating element 76. In step 104, the exhaust heating module 80 operates the engine 22 at the predetermined engine speed during idle. In step 106, the temperature determination module 82 determines whether the exhaust temperature has reached the predetermined exhaust temperature based on at least one of a period of time and EMT signals. If false, the method 100 repeats step 106. If true, the method 100 continues with step 108. In step 108, the resistance measuring module 84 enables the heating element 76 and measures the resistance of the heating element 76. In step 110, the resistance measuring module 84 determines the heating element model based on the resistance of the heating element 76. The method 100 ends in step 112.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control module comprising:
   an exhaust heating module that operates an engine at a predetermined speed to generate an exhaust gas having a predetermined temperature, wherein said exhaust gas heats a heating element of an oxygen sensor;
   a temperature determination module that determines, based on said predetermined speed, when said heating element is heated to said predetermined temperature; and
   a resistance measuring module that determines a resistance of said heating element when said heating element is heated to said predetermined temperature.

2. The engine control module of claim 1 wherein said exhaust heating module deactivates electrical heating of said heating element before operating said engine at said predetermined speed.

3. The engine control module of claim 1 wherein said engine is operated at said predetermined speed for a predetermined period that begins at engine start-up and ends when said exhaust gas is heated to said predetermined temperature.

4. The engine control module of claim 1 wherein said temperature determination module determines when said heating element is heated to said predetermined temperature based on temperature signals generated by an exhaust manifold air temperature sensor.

5. The engine control module of claim 1 wherein said resistance measuring module activates electrical heating of said heating element when said heating element is heated to said predetermined temperature.

6. The engine control module of claim 1 wherein said resistance measuring module determines said resistance of said heating element by measuring current through said heating element when a voltage is applied to said heating element.

7. The engine control module of claim 1 wherein said resistance measuring module determines a resistance-temperature relationship for said heating element based on said resistance and said predetermined temperature.

8. The engine control module of claim 7 wherein when an operating resistance of said heating element is measured, an operating temperature of said heating element is determined based on said resistance-temperature relationship.

9. A method comprising:
operating an engine at a predetermined speed to generate an exhaust gas having a predetermined temperature;
heating a heating element of an oxygen sensor using said exhaust gas;
determining, based on said predetermined speed, when said heating element is heated to said predetermined temperature; and
determining a resistance of said heating element when said heating element is heated to said predetermined temperature.

10. The method of claim 9 further comprising deactivating electrical heating of said heating element before operating said engine at said predetermined speed.

11. The method of claim 9 further comprising operating said engine at said predetermined speed for a predetermined period that begins at engine start-up and ends when said exhaust gas is heated to said predetermined temperature.

12. The method of claim 9 further comprising determining when said heating element is heated to said predetermined temperature based on temperature signals generated by an exhaust manifold air temperature sensor.

13. The method of claim 9 further comprising activating electrical heating of said heating element when said heating element is heated to said predetermined temperature.

14. The method of claim 9 further comprising determining said resistance of said heating element by measuring current through said heating element when a voltage is applied to said heating element.

15. The method of claim 9 further comprising determining a resistance-temperature relationship for said heating element based on said resistance and said predetermined temperature.

16. The method of claim 15 further comprising determining, based on said resistance-temperature relationship, an operating temperature of said heating element after an operating resistance of said heating element is measured.

* * * * *